(12) United States Patent
Lu et al.

(10) Patent No.: US 7,843,520 B2
(45) Date of Patent: Nov. 30, 2010

(54) DISPLAY APPARATUS WITH TRANSISTORS CONNECTED TO SUB-PIXEL ELECTRODES

(75) Inventors: Jiangang Lu, Suwon-si (KR); Sung-Woon Kim, Suwon-si (KR); Seung-Hoon Lee, Yongin-si (KR); Hee-Seop Kim, Hwaseong-si (KR); Chun-Seok Ko, Hwaseong-si (KR); Mee-Hye Jung, Suwon-si (KR); Si-Duk Sung, Seoul (KR); Kwang-Chul Jung, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 188 days.

(21) Appl. No.: 12/274,666

(22) Filed: Nov. 20, 2008

(65) Prior Publication Data

US 2009/0268112 A1   Oct. 29, 2009

(30) Foreign Application Priority Data

Apr. 23, 2008   (KR) .................. 10-2008-0037776

(51) Int. Cl.
G02F 1/1343   (2006.01)
G02F 1/13   (2006.01)

(52) U.S. Cl. ................... 349/38; 349/39; 349/144; 349/187

(58) Field of Classification Search ............. None
See application file for complete search history.

(56) References Cited

U.S. PATENT DOCUMENTS

| 7,719,623 | B2 * | 5/2010 | Hsieh et al. | 349/39 |
| 2007/0064182 | A1 * | 3/2007 | Lin et al. | 349/114 |
| 2007/0159587 | A1 * | 7/2007 | Kim et al. | 349/144 |

* cited by examiner

Primary Examiner—Tina M Wong
(74) Attorney, Agent, or Firm—Innovation Counsel LLP

(57) ABSTRACT

A display apparatus includes a plurality of pixel regions. Each of the pixel regions includes a first sub-pixel region, a second sub-pixel region and a boost capacitor. The first sub-pixel region and the second sub-pixel region are electrically connected to the boost capacitor. The boost capacitor causes voltages the first and second sub-pixel regions to be at different voltages to increase the viewing angle of the display apparatus. One electrode of the boost capacitor, a coupling electrode, is formed over a storage capacitance line made of an opaque metal such that an additional boost capacitor (Cboost) may be formed without decreasing the aperture ratio of the pixel region. Other features are also provided.

18 Claims, 8 Drawing Sheets

DISPLAY APPARATUS WITH TRANSISTORS CONNECTED TO SUB-PIXEL ELECTRODES

CROSS REFERENCE TO RELATED APPLICATIONS

The present application claims priority of South Korean patent application no. 10-2008-0037776 filed on Apr. 23, 2008, incorporated herein by reference.

BACKGROUND OF THE INVENTION

1. Field of the Invention

The present invention relates to a display apparatus, and more particularly to a Liquid Crystal Display device ("LCD") driven by thin film transistors ("TFT") formed on a substrate.

2. Description of the Related Art

Generally speaking, a display apparatus is a kind of an interface device that makes images defined by information sources to be visually perceivable to human beings.

Many types of display devices are known, including LCD (Liquid crystal Display), PDP (Plasma Display Panel), and OLED (Organic Light Emitting Diode). All these are flat panel displays. In particular, liquid crystal displays (LCD) are widely used for laptop computers, desktop monitors, and televisions because of their superior resolution, color capabilities, and overall display quality.

An LCD may include two panels provided with field-generating electrodes such as pixel electrodes and a common electrode, and a liquid crystal (LC) layer interposed therebetween. The LCD displays images by applying voltages to the field-generating electrodes to generate an electric field in the LC layer. The electric field determines the orientations of LC molecules in the LC layer to adjust the polarization of incident light.

The LCD includes a plurality of thin film transistors (TFT) connected with the pixel electrodes and also includes a plurality of signal lines connected with the TFTs, such as gate lines and data lines.

One known LCD type is a vertically aligned (VA) LCD, in which LC molecules are aligned such that their long axes are perpendicular to the panels in the absence of an electric field. The VA LCD offers a high contrast ratio and a wide reference viewing angle. The reference viewing angle is defined as a viewing angle with the contrast ratio equal to 1:10 (the contrast ratio is the luminosity ratio between the darkest and brightest colors).

The viewing angle of the VA mode LCD can be increased, for example, by providing suitable cutouts or protrusions in the field-generating electrodes. The cutouts and the protrusions cause the tilt angles of the LC molecules to spread in different directions such that the reference viewing angle can be widened.

However, the cutouts and the protrusions decrease the aperture. Also, the lateral visibility of the VA mode LCD is low. For example, images displayed by a patterned vertically aligned (PVA) LCD equipped with the cutouts become brighter as the viewing angle increases, making it harder to tell the difference between different bright colors.

In order to improve lateral visibility of an LCD, a variety of methods have been suggested which involve dividing a pixel electrode into a pair of sub-pixel electrodes, driving the sub-pixel electrodes with different voltages using different thin film transistors (TFT), and using a coupling capacitor that changes the voltage of one but not both of the sub-pixel electrodes of a pixel.

SUMMARY

One aspect of the present invention provides a display apparatus having excellent lateral visibility without image sticking. However, the present invention is not restricted to this aspect. The above and other aspects of the present invention will become apparent to one of ordinary skill in the art to which the present invention pertains by referencing the description below. The invention is defined by the appended claims.

Some embodiments of the present invention provide a display apparatus comprising: a first gate line and a second gate line; a data line traversing the first and second gate lines; a first sub-pixel electrode; a first transistor connected to the first gate line, the data line, and the first sub-pixel electrode; a second sub-pixel electrode; a second transistor connected to the first gate line, the data line, and the second sub-pixel electrode; a storage capacitance electrode; a third transistor connected to the first gate line and the storage capacitance electrode; a coupling electrode formed over the storage capacitance electrode, the coupling electrode overlapping the first sub-pixel electrode to form a boost capacitor; and a fourth transistor connected to the second gate line, the coupling electrode and the second sub-pixel electrode.

The third transistor may comprise a source electrode connected to the coupling electrode and a drain electrode connected to the storage capacitance electrode, and the fourth transistor may comprise a source electrode connected to the coupling electrode and a drain electrode connected to the second sub-pixel electrode.

The drain electrode of the third transistor may be connected to the storage capacitance electrode via a connecting electrode.

The drain electrode of the third transistor and the storage capacitance electrode may be made of different metal layers.

The source electrode of the third transistor and the source electrode of the fourth transistor may be made of the same metal layer.

The storage capacitance electrode may overlap the first sub-pixel electrode to form a first storage capacitor, and the storage capacitance electrode may overlap the second sub-pixel electrode to form a second storage capacitor.

The display apparatus may further comprise: a first auxiliary electrode forming the first storage capacitor with the storage capacitance electrode and connected to the first sub-pixel electrode through a first contact hole; and a second auxiliary electrode forming the second storage capacitor with the storage capacitance electrode and connected to the second sub-pixel electrode through a second contact hole.

The storage capacitance electrode may comprise a first portion overlapping the second sub-pixel electrode to form a second storage capacitor and a second portion having a narrower width than the first portion and overlapping the first sub-pixel electrode to form a first storage capacitor.

The display apparatus may further comprise: a third auxiliary electrode forming the second storage capacitor with the first portion of the storage capacitance electrode, wherein the third auxiliary electrode may be connected to the second sub-pixel electrode through a contact hole.

Manufacturing methods for the display apparatus are also provided.

DESCRIPTION OF SOME EMBODIMENTS

Figure 1:
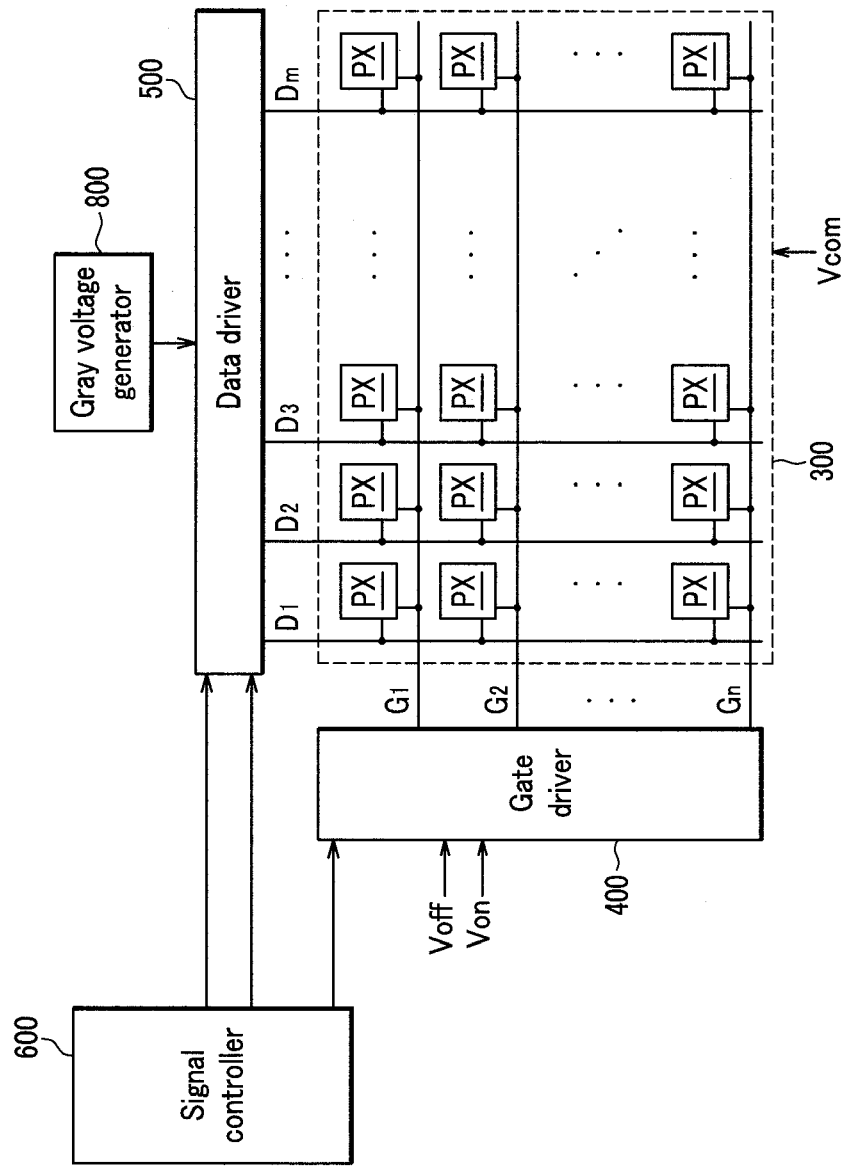
FIG. 1 is a block diagram illustrating a liquid display apparatus according to an exemplary embodiment of the invention.

Advantages and features of some embodiments of the present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those of ordinary skill in the art, and the present invention will only be defined by the appended claims.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, then intervening elements may or may not be present. In contrast, when an element is referred to as being "directly on" another element, then there are no intervening elements.

A display apparatus according to some embodiments of the present invention will now be described with reference to FIG. 1 to FIG. 6. This display apparatus is a liquid crystal display. FIG. 1 is a block diagram of the liquid crystal display, and FIG. 2 is an equivalent circuit diagram of one pixel of the liquid crystal display.

Figure 2:
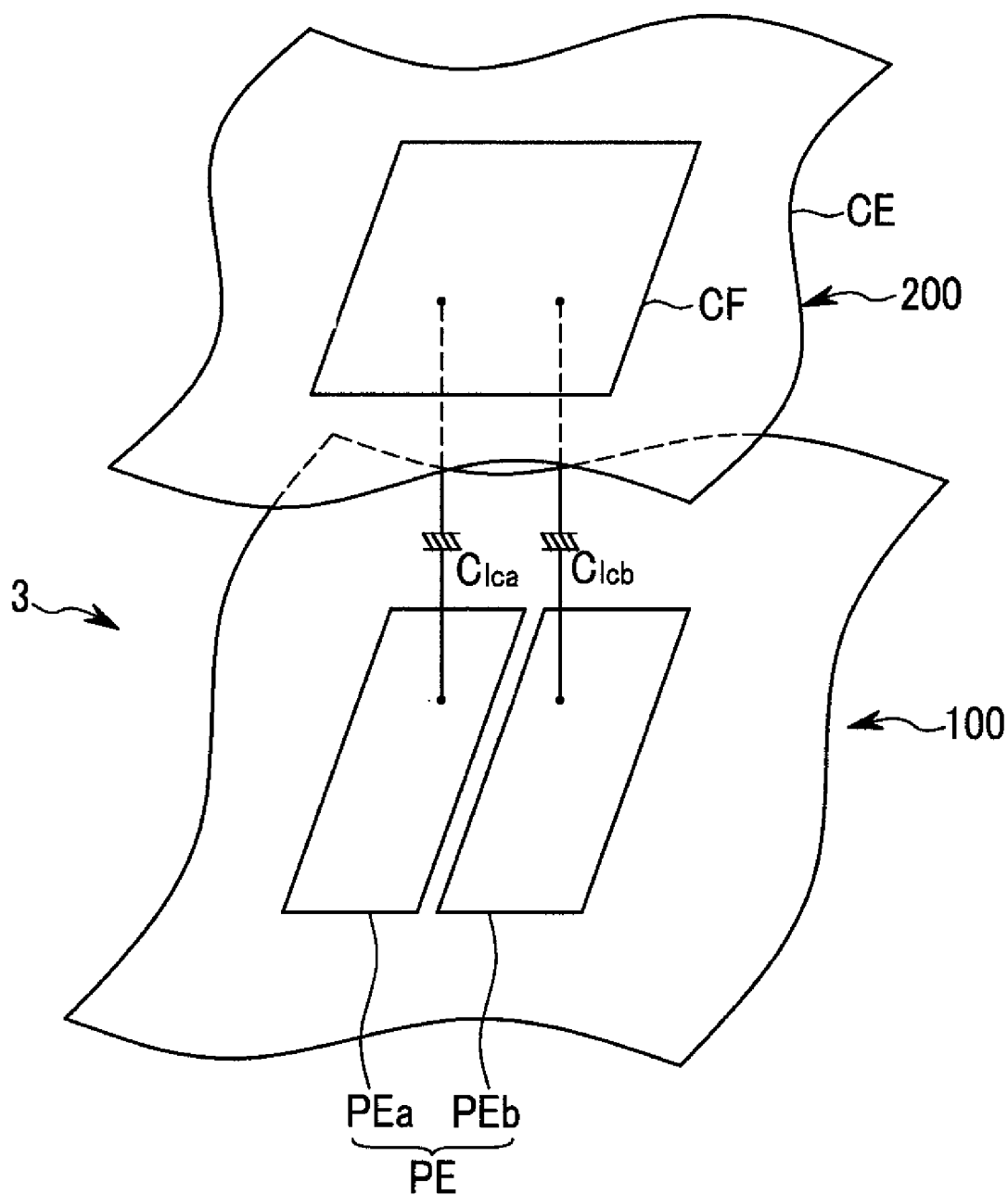
FIG. 2 is a pictorial perspective diagram illustrating a pixel of the type employed in FIG. 1.

As shown in FIG. 1 and FIG. 2, the liquid crystal display apparatus includes a liquid crystal panel assembly 300, a gate driver 400 and a data driver 500 that are connected to the liquid crystal panel assembly 300, a gray-voltage generator 800 connected to the data driver 500, and a signal controller 600 for controlling the above elements.

The liquid crystal panel assembly 300 includes a plurality of signal lines G1-Gn and D1-Dm and a plurality of pixels PX connected to the signal lines and arranged in a matrix. These elements are formed in a first substrate 100 and a second substrate 200 facing each other. A liquid crystal 3 is interposed between the first and second substrates 100 and 200 (see FIG. 2).

The signal lines G1-Gn are gate lines that transmit gate signals (also referred to as "scanning signals"), and the signal lines D1-Dm are data lines that transmit data signals. The gate lines G1 through Gn extend substantially in a row direction and substantially in parallel to each other, and the data lines D1-Dm extend substantially in a column direction and substantially in parallel to each other.

Each pixel PX includes a pixel electrode PE which includes a pair of sub-pixel electrodes PEa and PEb. Each sub-pixel electrode PEa, PEb provides a capacitor plate to the respective liquid crystal capacitor Clca, Clcb. Each pixel PX is connected to at least one gate line and at least one data line, and includes at least one switching element (not shown in FIG. 2) connected to at least one of the liquid crystal capacitors Clca or Clcb.

The sub-pixel electrodes PEa, PEb are formed on the first substrate 100. A common electrode CE formed on the second substrate 200 provides the other capacitor plate to the liquid crystal capacitors Clca, Clcb. The liquid crystal layer disposed between the sub-pixel electrodes PEa and PEb on the one hand and the common electrode CE on the other hand functions as the capacitor dielectric. Each pixel's sub-pixel electrodes PEa and PEb are spaced from each other, and together form one pixel electrode PE.

The common electrode CE is connected to the common voltage Vcom, and covers the entire surface of the second substrate 200. The liquid crystal layer 3 has negative dielectric anisotropy ($\Delta\epsilon<0$). In the absence of an electric field, the liquid crystal molecules in the liquid crystal layer 3 are aligned such that their long axes are substantially perpendicular to the surfaces of the first substrate 100 and the second substrate 200. Alternatively, the common electrode CE may be disposed on the first substrate 100, and, in this case, one or more of the pixel electrodes PE and the common electrode CE may have shapes resembling bars or stripes.

In order to display colors, each pixel PX uniquely displays a respective one of three primary colors such as red, green, or blue (R, C, and B). This is called spatial division. Alternatively, each pixel PX may sequentially display each of the three primary colors (temporal division). In either case, the spatial or temporal sum of the primary colors is perceived as a desired color. FIG. 2 illustrates the spatial division, with a color filter CF on the second substrate 200. In other embodiments, the color filter CF may be provided on the first substrate 100.

One or more polarizers (not shown) may be attached to at least one of the first substrate 100 and the second substrate 200 to transform light polarization into light transmittance.

Referring to FIG. 1 again, the gray voltage generator 800 generates two sets of "gray" voltages (or "reference gray" voltages) related to the transmittances of the pixels PX. One of the sets consists of voltages of positive polarity with respect to the common voltage Vcom, while the other set consists of voltages of negative polarity with respect to the common voltage Vcom. The positive-polarity gray voltages and negative-polarity gray voltages are alternately supplied to the liquid crystal panel 100 during inversion driving.

The gate driver 400 is connected to the gate lines G1-Gn of the liquid crystal panel assembly 300, and applies gate signals to the gate lines. Each gate signal alternates between a gate-on voltage Von and a gate-off voltage Voff. The gate-on voltage level Von and the gate-off voltage level Voff can be generated by an external device and provided to the gate driver 400.

The data driver 500 is connected to the data lines D1-Dm of the liquid crystal panel assembly 300. The data driver 500 selects data signals from the gray voltages supplied from the gray voltage generator 800 and applies the selected data signals to the data lines D1-Dm.

The signal controller 600 controls the gate driver 400 and the data driver 500.

The gate driver 400, the data driver 500, or the gray voltage generator 800 may be directly mounted on the liquid crystal panel assembly 300 in the form of at least one IC chip. Alternatively, the gate driver 400 or the data driver 500 may be attached to the liquid crystal panel 300 in the form of a tape carrier package ("TCP") mounted on a flexible printed circuit ("FPC") film (not shown). As a further alternative, the gate driver 400 or the data driver 500 may be integrated on the liquid crystal panel assembly 300 together with the signal lines G1-Gn and D1-Dm and the thin film transistors.

Figure 3:
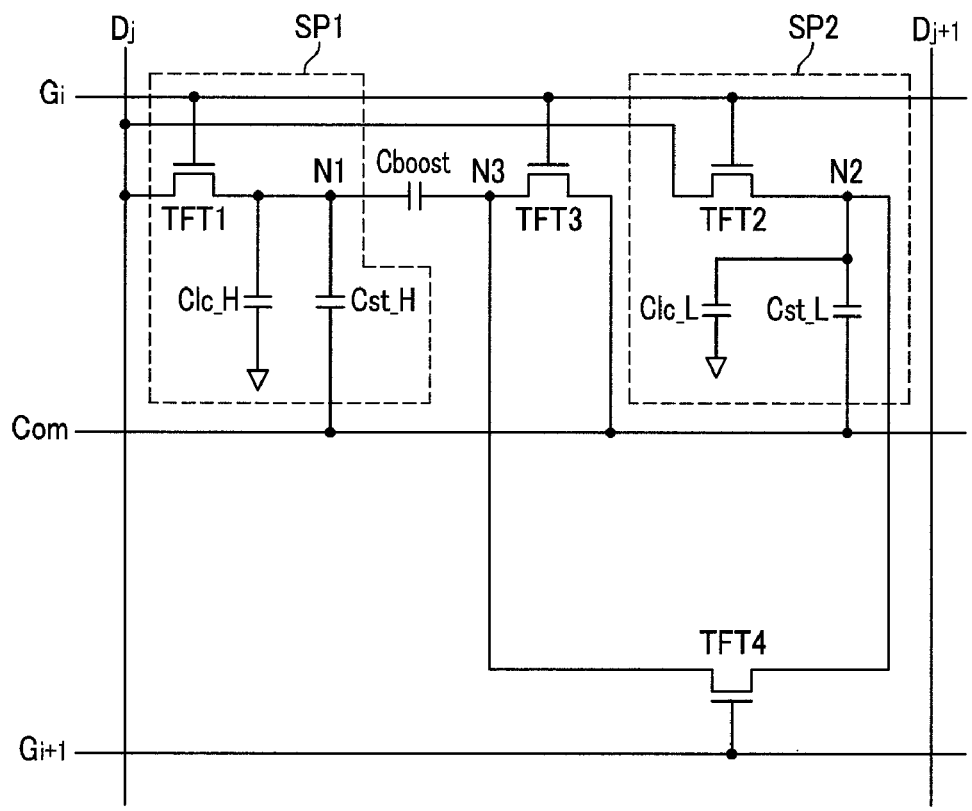
FIG. 3 is an equivalent circuit diagram of a pixel of a liquid crystal display apparatus according to an embodiment of the invention.
Figure 4:
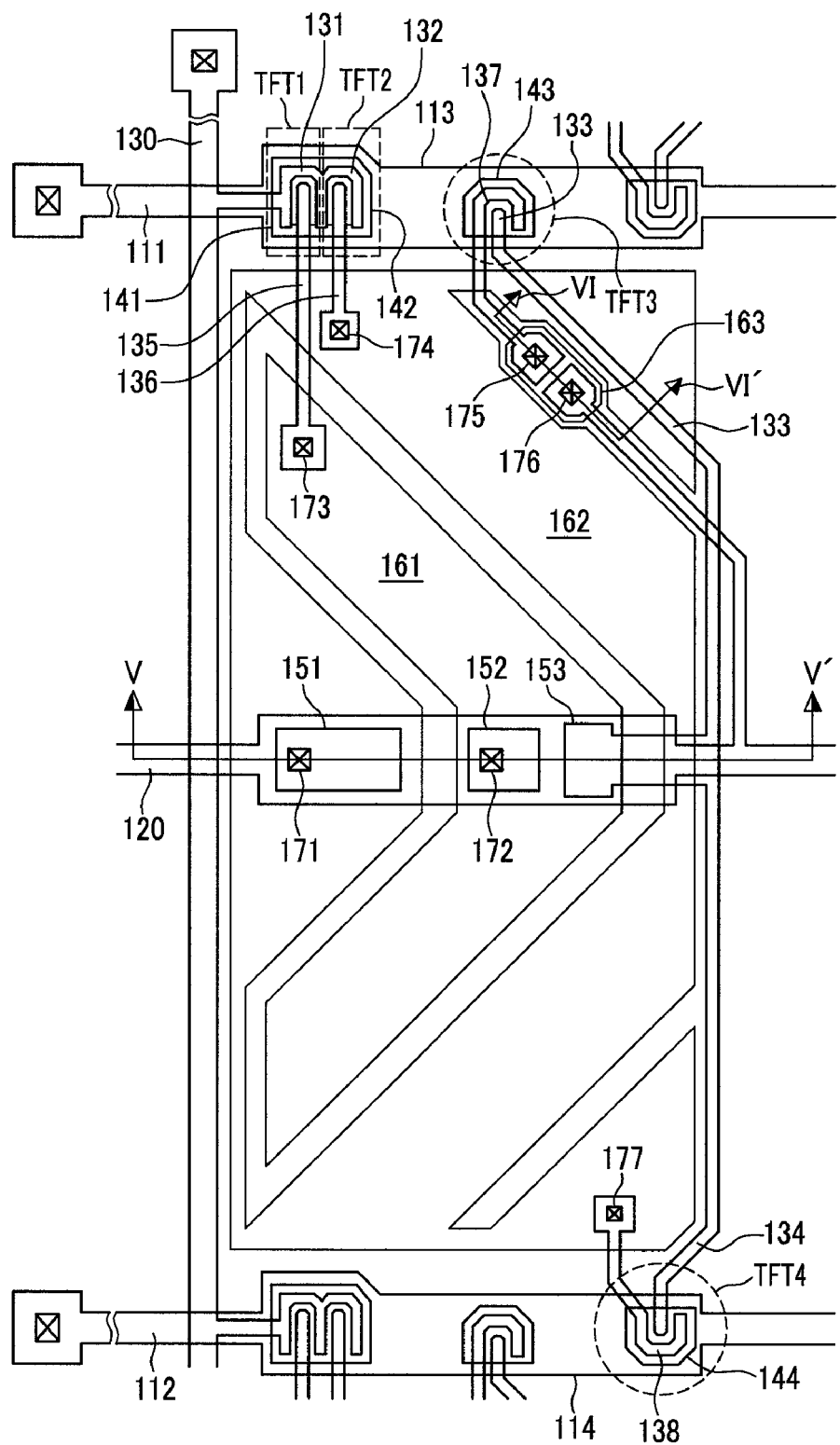
FIG. 4 is a plan view of a pixel of a liquid crystal display according to an embodiment of the invention.

FIG. 3 to FIG. 6 illustrate an implementation of the liquid crystal panel assembly 300 according to the first embodiment of the present invention. This liquid crystal panel assembly includes the gate lines G1-Gn that receive the gate signals to sequentially apply the gate-on voltage Von to the consecutive rows of the thin film transistors (TFTs). FIG. 3 shows two adjacent gate lines Gi, Gi+1, which are shown respectively at 111 and 112 in FIG. 3. Each of the data lines D1-Dm traverses the gate lines. FIG. 3 shows two adjacent data lines Dj, Dj+1. The data line Dj is shown at 130 in FIGS. 4-5. The data lines apply data signals ("image signals") to the TFTs. The pixel regions are each formed between two adjacent gate lines (e.g. Gi and Gi+1) and between two adjacent data lines (e.g. Dj and Dj+1). Additional pixel regions can be provided below the gate line Gn. FIGS. 3-6 illustrate a typical pixel region between gate lines Gi, Gi+1 and between data lines Dj, Dj+1. The remaining pixels can be identical, except possibly for the pixels below the gate line Gn.

In the embodiment of FIGS. 3-6, each of the pixel regions includes a first sub-pixel region (SP1) and a second sub-pixel region (SP2). The first sub-pixel region (SP1) includes a first TFT (TFT1), a first liquid crystal capacitor (Clc_H, corresponding to Clca in FIG. 2), and a first storage capacitor (Cst_H). The second sub-pixel region (SP2) includes a second TFT (TFT2), a second liquid crystal capacitor (Clc_L, corresponding to Clcb in FIG. 2), and a second storage capacitor (Cst_L).

The first TFT (TFT1) includes a gate electrode (113) which is connected to, or is a part of, the i-th gate line (Gi, 111); a source electrode (131) which is connected to, or is a part of, the j-th data line (Dj, 130); a drain electrode (135) connected to a first sub-pixel electrode (161) through a contact hole (173); and a first semiconductor feature (141) containing the channel region of the first TFT. The first sub-pixel electrode (161) corresponds to sub-pixel electrode PEa of FIG. 2 and forms a capacitor plate of the first liquid crystal capacitor (Clc_H) whose other plate is provided by the common electrode (CE) formed on the second substrate (200). The first sub-pixel electrode (161) also provides a capacitor plate to the first storage capacitor (Cst_H) whose other plate is provided by a storage electrode (Com, 120) which runs in parallel to the gate lines G1-Gn.

The second TFT (TFT2) includes a gate electrode (113) which is connected to, or is a part of, the i-th gate line (Gi, 111); a source electrode (132) which is connected to, or is a part of, the j-th data line (Dj, 130); a drain electrode (136) connected to a second sub-pixel electrode (162) through a contact hole (174); and a second semiconductor feature (142) containing the channel region of the second TFT. The second sub-pixel electrode (162) corresponds to sub-pixel electrode PEb of FIG. 2 and forms a capacitor plate of the second liquid crystal capacitor (Clc_L) whose other plate is provided by the common electrode (CE) formed on the second substrate (200). The second sub-pixel electrode (162) also provides a capacitor plate for the second storage capacitor (Cst_L) whose other plate is provided by the storage electrode (Com, 120).

The first and second storage capacitors (Cst_H and Cst_L) may have their capacitance increased if they are formed between the first auxiliary electrode (152) and the storage electrode (Com, 120) and between the second auxiliary electrode (151) and the storage electrode (Com, 120) respectively. The first auxiliary electrode (152) can be connected to the first sub-pixel electrode (161) through a contact hole (172), and the second auxiliary electrode (151) can be connected to the second sub-pixel electrode (162) through a contact hole (171).

Each pixel further includes a third TFT (TFT 3), a fourth TFT (TFT 4) and a boost capacitor (Cboost).

The third TFT (TFT 3) includes a gate electrode (113) which is connected to, or is part of, the i-th gate line (Gi, 111); a source electrode (133); a drain electrode (137); and a third semiconductor feature (143) containing the channel region of the third TFT. The source electrode (133) is connected to a coupling electrode (153) overlapping the first sub-pixel electrode (161) to form the boost capacitor (Cboost), and the drain electrode (137) is connected to the storage electrode (120) via a connecting electrode (163).

The fourth TFT (TFT 4) includes a gate electrode (114) which is connected to, or is part of, the (i+1)-th gate line (Gi+1); a source electrode (134); a drain electrode (138); and a fourth semiconductor feature (144) containing the channel region of the fourth TFT. The source electrode (134) is connected to the coupling electrode (153), and the drain electrode (138) is connected to the second sub-pixel electrode (162) through a contact hole (177).

The connecting electrode (163) is connected to the drain electrode (137) of the third TFT (TFT 3) through a contact hole (175) and to the storage electrode (120) through a contact hole (176). Accordingly, the drain electrode (137) of the third TFT (TFT 3) and the storage electrode (120) are connected to each other via the connecting electrode (163).

The first to fourth semiconductor features (141, 142, 143, and 144) may be made of an amorphous silicon layer, a polysilicon layer, or a monocrystalline silicon layer.

Data voltages charging the first and second liquid crystal capacitors (Clc_H and Clc_L) change the orientation of the liquid crystal molecules located between the first and second sub-pixel electrodes (161 and 162) on the one hand and the common electrode (CE) on the other hand. The first and second storage capacitors (Cst_H and Cst_L) enhance the voltage storing capacity of the first and second liquid crystal capacitors (Clc_H and Clc_L) so that the data voltages charging the first and second liquid crystal capacitors (Clc_H and Clc_L) are stably maintained during one frame. The storage electrode (120) is supplied with a predetermined voltage such as the common voltage.

The boost capacitor (Cboost) is formed by an overlap between the coupling electrode (153) and the first sub-pixel electrode (161) which are separated by a passivation layer (180). In one embodiment of the present invention, the storage electrode (120) may be made of an opaque metal of the same layer as the gate lines. This layer is called "gate metal" or "gate metal layer" below. The coupling electrode (153) is disposed on the storage electrode (120) made of the gate metal layer, and thereby an additional boost capacitor (Cboost) may be formed without decreasing the aperture ratio of the pixel region.

The boost capacitor (Cboost) and the third TFT (TFT 3) decrease the voltage across the second liquid crystal capacitor (Clc_L) and increase the voltage across the first liquid crystal capacitor (Clc_H) such that the viewing angle of the liquid crystal display is increased.

When the gate-on voltage is applied to the first gate line (111), the first to third TFTs (TFT 1, TFT 2, and TFT 3) are turned on at the same time such that the first sub-pixel electrode (161) and the second sub-pixel electrode (162) receive the same data voltages and the coupling electrode (153)

receives the common voltage (Vcom). As a result, the boost capacitor (Cboost) is charged up to the voltage difference between the first sub-pixel electrode (161) and the coupling electrode (153).

Then, when the first gate line (111) receives the gate-off voltage, the first sub-pixel region (SP1) and the second sub-pixel region (SP2) are electrically separated from each other in the sense that the first sub-pixel electrode (161) and the second sub-pixel electrode (162), which were charged by the same data voltage, are now electrically floating.

When the gate-on voltage is applied to the second gate line (112), the fourth TFT (TFT 4) is turned on. Consequently, the data voltage charging the second sub-pixel electrode (162) is distributed to the coupling electrode (153) via the fourth TFT (TFT 4) until the second sub-pixel electrode (162) and the coupling electrode (153) are at the same voltage. Hence, the voltage of the coupling electrode (153) is changed. Consequently, the voltages of the first sub-pixel electrode (161) and the second sub-pixel electrode (162) also change and become different from the data voltage which initial charged these electrodes.

The voltage changes of the first and the second sub-pixel electrodes (161, 162) will now be described in more detail using the law of conservation of electrical charge.

With reference to FIG. 3, the term "first node (N1)" refers below to the node between the output terminal of the first TFT (TFT 1) and the boost capacitor (Cboost). The term "second node (N2)" refers to the node between the output terminal of the second TFT (TFT 2) and the input terminal of the fourth TFT (TFT 4), and the term "third node (N3)" refers to the node between the boost capacitor (Cboost) and the output terminal of the fourth TFT (TFT 4).

When the first gate line (Gi) is supplied with the gate-on voltage, the data voltage (Vd) is applied to the first node (N1) and the second node (N2) via the first TFT (TFT 1) and the second TFT (TFT 2). The common voltage (Vcom) is applied to the third node (N3) via the third TFT (TFT 3). If the common voltage is assumed to be 0 V for convenience of explanation, the first node (N1) and the second node (N2) are charged to the voltage Vd and the third node (N3) is charged to the voltage of 0 V. As a result, the first liquid crystal capacitor (Clc_H) and the first storage capacitor (Cst_H) in combination store some charge Qh. The second liquid crystal capacitor (Clc_L) and the second storage capacitor (Cst_L) in combination store some charge Ql. The boost capacitor (Cboost) stores some charge Qb. By definition of capacitance, the following Equations 1 hold true:

$$Qh = Ch \times Vd$$

$$Ql = Cl \times Vd$$

$$Qb = Cb \times Vd \quad \text{[Equations 1]}$$

where Ch is the total capacitance of the first liquid crystal capacitor (Clc_H) and the first storage capacitor (Cst_H), Cl is the total capacitance of the second liquid crystal capacitor (Clc_L) and the second storage capacitor (Cst_L), and the Cb is the capacitance of the boost capacitor.

Then, when the gate-off voltage is applied to the first gate line (Gi) and the gate-on voltage is applied to the second gate line (Gi+1), the first to third TFTs are turned off and the fourth TFT (TFT 4) is turned on. As a result, the total charge in the first liquid crystal capacitor (Clc_H) and the first storage capacitor (Cst_H) changes from Qh to some value Qh', the total charge in the second liquid crystal capacitor (Clc_L) and the second storage capacitor (Cst_L) changes from Ql to some value Ql', and the charge in the boost capacitor changes from Qb to some value Qb'. By the law of conservation of electrical charge, the following Equations 2 hold true:

$$Qh' = Ch \times V1$$

$$Ql' = Cl \times V2$$

$$Qb' = Cb \times (V1 - V2) \quad \text{[Equations 2]}$$

where V1 is the voltage at the first node (N1) and V2 is the voltage at the second node (N2).

Due to the conservation of the total electrical charge stored in the capacitors (Clc_H, Cst_H, Cboost) connected to the first node (N1), the following Equation 3 holds true:

$$Qh + Qb = Qh' + Qb' \quad \text{[Equation 3]}$$

Due to the conservation of the total electrical charge stored in the capacitors (Clc_L, Cst_L, Cboost) connected to the third node (N3), the following Equation 4 holds true:

$$Ql - Qb = Ql' - Qb' \quad \text{[Equation 4]}$$

With reference to Equations 1 to 4, the voltages (V1, V2) on the first node (N1) and the third node (N3) satisfy the following Equations 5:

$$V1 = Vd\left(1 + \frac{Cl \cdot Cb}{Cl \cdot Ch + Ch \cdot Cb + Cb \cdot Cl}\right) \quad \text{[Equations 5]}$$

$$V2 = Vd\left(1 - \frac{Cl \cdot Cb}{Cl \cdot Ch + Ch \cdot Cb + Cb \cdot Cl}\right)$$

Note: The voltage of the third node (N3) is equal to the voltage of the second node (N2) due to the action of the fourth TFT (TFT 4).

If the data voltage (Vd) is larger than the common voltage (Vcom), i.e. is positive relative to Vcom, then the voltage charging the first sub-pixel region (SP1) is greater than the data voltage (Vd) while the voltage charging the second sub-pixel region (SP2) is smaller than the data voltage (Vd). And if the data voltage (Vd) is less than the common voltage (Vcom), i.e. is negative relative to Vcom, then the voltage charging the first sub-pixel region (SP1) is smaller than the data voltage (Vd) and the voltage charging the second sub-pixel region (SP2) is larger than the data voltage (Vd). Consequently, the voltage magnitude of the first sub-pixel region (SP1) is always greater than of the second sub-pixel region (SP2).

The liquid crystal display can have an increased viewing angle when the sub-pixel regions (SP1 and SP2) in one pixel region have different voltages. In other words, when the sub-pixel regions in one pixel region have different sub-pixel voltages based on the same data signal, the liquid crystal display can be adjusted to display optimized sub-pixel voltages for optimized viewing from different directions, for example from the front and sides.

Figure 5:
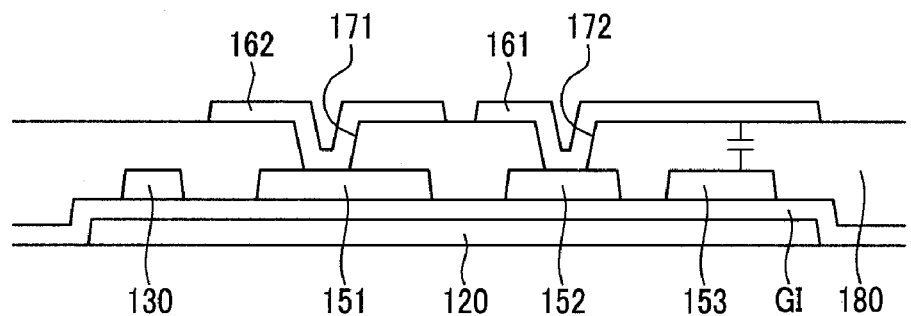
FIG. 5 is a cross-sectional view along a line V-V' in FIG. 4.

FIG. 5 shows a vertical cross section of the first and the second storage capacitors (Cst_H and Cst_L) in one pixel. The storage electrode (120) is formed on the lower substrate (100) and is made of the same metal layer as the gate lines (Gi (111), Gi+1 (112)). A gate insulating layer (GI) is formed on the gate lines (Gi (111), Gi+1 (112)) and on the storage electrode (120). The gate insulating layer is made of silicon nitride (SiNx) or silicon oxide (SiOx).

The first auxiliary electrode (152) and the second auxiliary electrode (151) are formed on the gate insulating layer (GI) of the same metal layer as the data lines (Dj (130) and Dj+1), such that the first auxiliary electrode (152) and the second auxiliary electrode (151) are insulated from the storage electrode (120).

The coupling electrode (153) is also formed on the gate insulating layer (GI) of the same metal layer as the data lines. This metal layer is called "data metal" or "data metal layer" below.

The passivation layer (180) is formed on the first auxiliary electrode (152), the second auxiliary electrode (151) and the coupling electrode (153). The passivation layer (180) is also made of silicon nitride (SiNx) or silicon oxide (SiOx).

The first sub-pixel electrode (161) and the second sub-pixel electrode (162) are formed on the passivation layer (180). The first and second sub-pixel electrodes (161, 162) are made of a transparent metal such as indium tin oxide (ITO) or indium zinc oxide (IZO).

The passivation layer (180) has a plurality of contact holes (171 and 172). In each pixel, the first sub-pixel electrode (161) and the second sub-pixel electrode (162) are connected to the first auxiliary electrode (152) and the second auxiliary electrode (151) through the contact holes (172, 171), respectively. Accordingly the first auxiliary electrode (152) and the second auxiliary electrode (151) receive the same data voltages as the first sub-pixel electrode (161) and the second sub-pixel electrode (162).

The first storage capacitor (Cst_H) is formed by an overlap between the first auxiliary electrode (152) and the storage electrode (120) which are separated from each other by the gate insulating layer (GI). The second storage capacitor (Cst_L) is formed by an overlap between the second auxiliary electrode (151) and the storage electrode (120) which are separated from each other by the gate insulating layer (GI).

The first and the second auxiliary electrodes (151, 152) may be omitted.

The boost capacitor (Cboost) is formed by an overlap between the first sub-pixel electrode (161) and the coupling electrode (153) disposed over the storage electrode (120). The passivation layer (180) separates the first sub-pixel electrode (161) from the coupling electrode (153).

Figure 6:
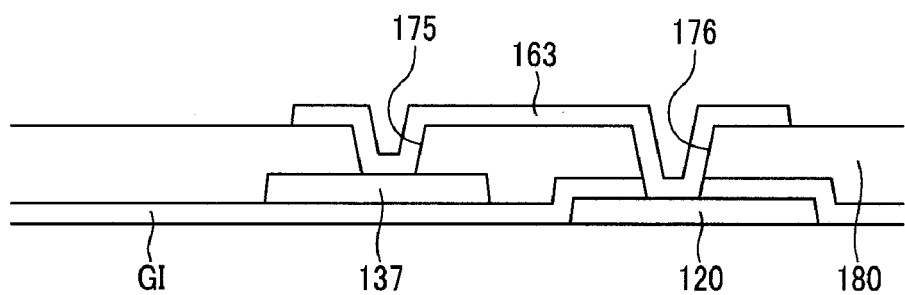
FIG. 6 is a cross-sectional view along a line VI-VI' in FIG. 4.

FIG. 6 shows a contact between the drain electrode (137) of the third TFT and the storage electrode (120). The drain electrode (137) of the third TFT made of the data metal and the storage electrode (120) made of the gate metal are connected to each other via the connecting electrode (163). The connecting electrode (163) is formed over the passivation layer (180). The passivation layer (180) has a plurality of contact holes (175 and 176). The drain electrode (137) of the third TFT (TFT3) is connected to the connecting electrode (163) through the contact hole (175), and the storage electrode (120) is connected to the connecting electrode (163) through the contact hole (176) such that the drain electrode of the third TFT (137) and the storage electrode (120) are connected to each other via the connecting electrode (163). The connecting electrode (163) may be formed of the same layer as the first sub-pixel electrode (161) and the second sub-pixel electrode (162).

Figure 7:
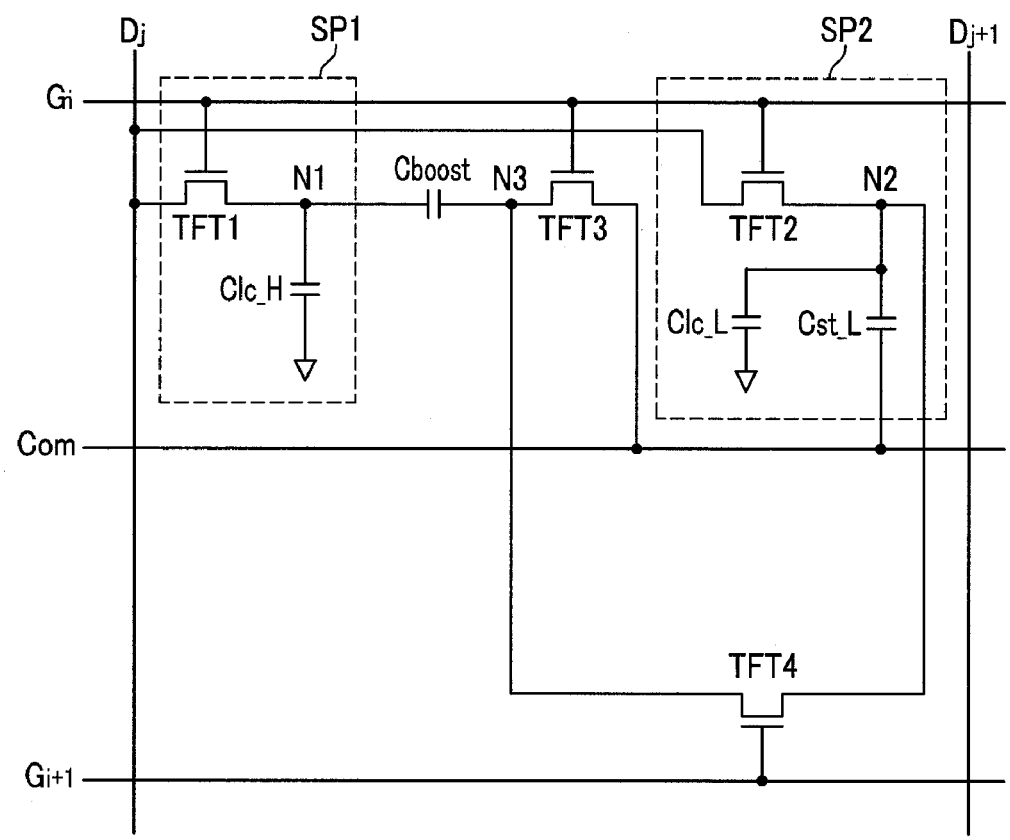
FIG. 7 is an equivalent circuit diagram of a pixel of a liquid crystal display apparatus according to an embodiment of the invention.
Figure 8:
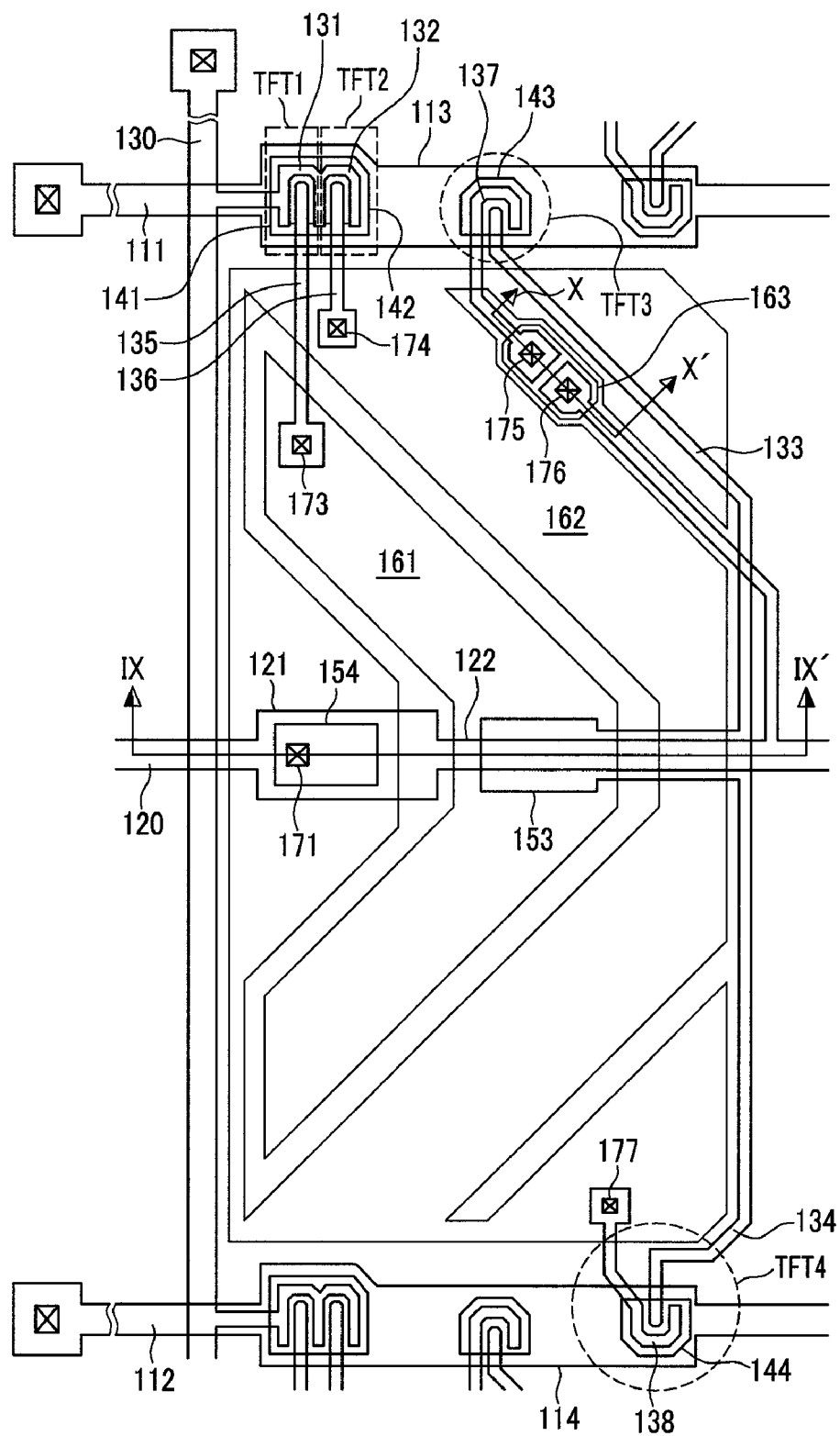
FIG. 8 is a plain view of a pixel of a liquid crystal display according to an embodiment of the invention.

Now a display apparatus according to the second embodiment of the present invention will be described in detail with reference to FIG. 7 to FIG. 10. This apparatus is a liquid crystal display. It includes the gate lines G1-Gn that receive the gate signals to sequentially apply the gate-on voltage Von to the respective rows of the thin film transistors (TFTs). FIG. 7 shows two consecutive gate lines Gi, Gi+1, which are shown respectively at 111 and 112 in FIG. 8. Each of the data lines D1-Dm traverses the gate lines and is insulated from the gate lines. FIG. 7 shows two consecutive data lines Dj, Dj+1. The data line Dj is shown at 130 in FIGS. 8-9. The data lines apply data signals ("image signals") to the TFTs. The pixel regions are each formed between two adjacent gate lines (e.g. Gi and Gi+1) and between two adjacent data lines (e.g. Dj and Dj+1). Additional pixel regions can be provided below the gate line Gn. FIGS. 7-10 illustrate a typical pixel region between gate lines Gi, Gi+1 and between data lines Dj, Dj+1. The remaining pixels can be identical, except possibly for the pixels below the gate line Gn.

In the embodiment of FIGS. 7-10, each of the pixel regions includes a first sub-pixel region (SP1) and a second sub-pixel region (SP2). The first sub-pixel region (SP1) includes a first TFT (TFT1) and a first liquid crystal capacitor (Clc_H). The second sub-pixel region (SP2) includes a second TFT (TFT2) and a second liquid crystal capacitor (Clc_L), and a second storage capacitor (Cst_L).

Compared to the first embodiment, the first auxiliary electrode (152) of the first sub-pixel region (SP1) is omitted and hence the voltage difference between the first sub-pixel region (SP1) and the second sub-pixel region (SP2) is increased. Accordingly, the viewing angle of the display apparatus may be increased.

Indeed, with reference to Equations 6 below, as the total capacitance (Ch) of the first sub-pixel region (SP1) is decreased, the first node (N1) has a higher voltage and the third node (N3) has a lower voltage compared to the first embodiment, such that the viewing angle of the display apparatus is increased.

$$V1 = Vd(1+(1/Ch)/(1/Ch+1/Cl+1/Cb))$$

$$V2 = Vd(1-(1/Ch)/(1/Ch+1/Cl+1/Cb))$$ [Equations 6]

Note: the same note applies here as immediately following the Equations 5 above.

To eliminate the storage capacitance of the first sub-pixel region (SP1), the first auxiliary electrode (152) of the first embodiment of the present invention is omitted, and further the storage electrode (120) is narrowed over the first sub-pixel electrode (161). More particularly, the storage electrode (120) has a first portion (121) and a second portion (122) which is narrower than the first portion (121). The first portion (121) of the storage electrode (120) overlaps the second sub-pixel electrode (162) to form the second storage capacitance (Cst_L). Likewise, the second portion (122) of the storage electrode (120) overlaps the first sub-pixel electrode (161), but this overlap's storage capacitance (which is part of the first sub-pixel region (SP1)) is lower than in the first embodiment. The storage capacitance of the first sub-pixel region (SP1) can be negligible because it its small compared to the second storage capacitance (Cst_L).

The first TFT (TFT1) includes a gate electrode (113) which is connected to, or is a part of, the i-th gate line (Gi, 111); a source electrode (131) which is connected to, or is a part of, the j-th data line (Dj, 130); a drain electrode (135) connected to the first sub-pixel electrode (161) through a contact hole (173); and a first semiconductor feature (141) containing the channel region of the first TFT. The first sub-pixel electrode (161) forms a capacitor plate of the first liquid crystal capacitor (Clc_H) whose other plate is provided by the common electrode (CE) formed on the second substrate (200).

The second TFT (TFT2) includes a gate electrode (113) which is connected to, or is a part of, the i-th gate line (Gi, 111); a source electrode (132) which is connected to, or is a part of, the j-th data line (Dj, 130); a drain electrode (136) connected to a second sub-pixel electrode (162) through a contact hole (174); and a second semiconductor feature (142) containing the channel region of the second TFT. The second sub-pixel electrode (162) forms a capacitor plate of the second liquid crystal capacitor (Clc_L) whose other plate is provided by the common electrode (CE) formed on the second substrate (200). The second sub-pixel electrode (162) also provides a capacitor plate to the second storage capacitor (Cst_L) whose other plate is provided by the storage electrode (Com, 120).

The second storage capacitor (Cst_L) may have its capacitance increased if it is formed between the auxiliary electrode (154) and the storage electrode (Com, 120). The auxiliary electrode (154) is connected to the second sub-pixel electrode (162) through a contact hole (171) and is disposed over the first portion (121) of the storage electrode (120).

Each of the pixel regions (SP1 and SP2) further includes a third TFT (TFT 3), a fourth TFT (TFT 4) and a boost capacitor (Cboost).

The third TFT (TFT 3) includes a gate electrode (113) which is connected to, or is a part of, the i-th gate line (Gi, 111); a source electrode (133); a drain electrode (137); and a third semiconductor feature (143) containing the channel region of the third TFT. The source electrode (133) is connected to a coupling electrode (153) overlapping the first sub-pixel electrode (161) to form the boost capacitor (Cboost), and the drain electrode (137) is connected to the storage electrode (120) via a connecting electrode (163).

The fourth TFT (TFT 4) includes a gate electrode (114) which is connected to, or is a part of, the (i+1)-th gate line (Gi+1); a source electrode (134); a drain electrode (138); and a fourth semiconductor feature (144) containing the channel region of the fourth TFT. The source electrode (134) is connected to the coupling electrode (153), and the drain electrode (138) is connected to the second sub-pixel electrode (162) through a contact hole (177).

The first to fourth semiconductor features (141, 142, 143, and 144) may be made of an amorphous silicon layer, a polysilicon layer, or a monocrystalline silicon layer.

The boost capacitor (Cboost) is formed by an overlap between the coupling electrode (153) and the first sub-pixel electrode (161), with a passivation layer (180) disposed therebetween. In one embodiment of the present invention, the storage electrode (120) may be made of an opaque metal which is part of the gate metal layer. The coupling electrode (153) is disposed over the storage electrode (120) made of the gate metal layer, and thereby an additional boost capacitor (Cboost) may be formed without decreasing the aperture ratio of the pixel region.

The boost capacitor (Cboost) and the third TFT (TFT 3) decrease the voltage across the second liquid crystal capacitor (Clc_L) and increase the voltage across the first liquid crystal capacitor (Clc_H) such that the viewing angle of the liquid crystal display is increased.

When the gate-on voltage is applied to the first gate line (111), the first to the third TFTs (TFT 1, TFT 2, and TFT 3) are turned on at the same time such that the first sub-pixel electrode (161) and the second sub-pixel electrode (162) receive the same data voltages and the coupling electrode (153) receives the common voltage (Vcom). As a result, the boost capacitor (Cboost) is charged up to the voltage difference between the first sub-pixel electrode (161) and the coupling electrode (153).

Then, when the first gate line (111) receives the gate-off voltage, the first sub-pixel region (SP1) and the second sub-pixel region (SP2) are electrically separated from each other in the sense that the first sub-pixel electrode (161) and the second sub-pixel electrode (162), which were charged by the same data voltage, are now electrically floating.

When the gate-on voltage is applied to the second gate line (112), the fourth TFT (TFT 4) is turned. Consequently, the data voltage charging the second sub-pixel electrode (162) is distributed to the coupling electrode (153) via the fourth TFT (TFT 4) until the second sub-pixel electrode (162) and the coupling electrode (153) are at the same voltage. Hence, the voltage of the coupling electrode (153) is changed. Consequently, the voltages in the first sub-pixel electrode (161) and the second sub-pixel electrode (162) also change and become different from the data voltage which initial charged these electrodes.

The first sub-pixel region (SP1) and the second sub-pixel region (SP2) are at different voltage levels in accordance with the equations 1 to 6 above. As explained above, the voltage difference is increased as a result of the elimination of the first auxiliary electrode (152) of the first storage capacitor (Cst_H) of the first embodiment to increase the viewing angle.

The capacitance of the second storage capacitor (Cst_L) may be decreased by not widening the first portion (121) of the storage electrode (120) as needed to increase the viewing angle.

Figure 9:
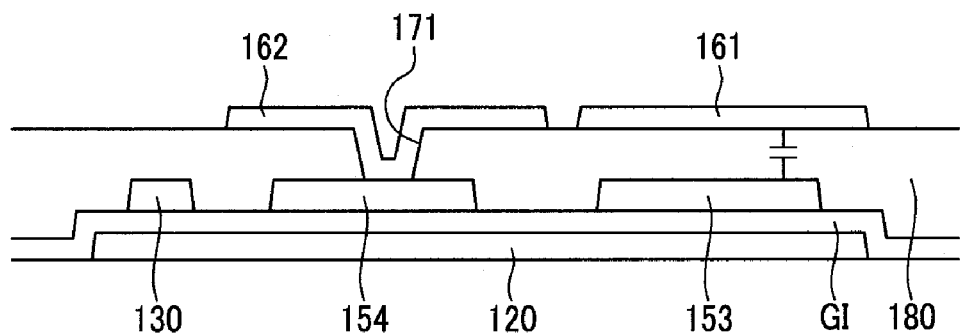
FIG. 9 is a cross-sectional view along a line IX-IX' in FIG. 8.

FIG. 9 shows a cross-sectional view of the second storage capacitor (Cst_L) and the boost capacitor (Cboost) in one pixel. The storage electrode (120) is formed on the lower substrate (100) and is made of the same metal layer as the gate lines G1-Gn (including the gate lines Gi (111), Gi+1 (112)). A gate insulating layer (GI) is formed on the gate lines G1-Gn and the storage electrode (120). The auxiliary electrodes (154) are made of the same metal layer as the data lines D1-Dm (e.g. data line Dj, 130) over the gate insulating layer (GI) which insulates the auxiliary electrodes (154) from the storage electrodes (120).

The coupling electrodes (153) are also formed on the gate insulating layer (GI) of the data metal layer.

The passivation layer (180) is formed on the auxiliary electrodes (154) and the coupling electrodes (153).

The first sub-pixel electrodes (161) and the second sub-pixel electrodes (162) are formed on the passivation layer (180).

In each pixel, the passivation layer (180) has the contact hole (171), and the second sub-pixel electrode (162) is connected to the auxiliary electrode (154) through the contact hole (171) such that the auxiliary electrode (154) is at the same voltage as the second sub-pixel electrode (162).

The second storage capacitor (Cst_L) is formed by an overlap between the auxiliary electrode (154) and the storage electrode (120) which are separated by the gate insulating layer (GI).

The auxiliary electrodes (154) may be omitted.

In each pixel, the boost capacitor (Cboost) is formed by an overlap between the first sub-pixel electrode (161) and the coupling electrode (153) disposed over the storage electrode (120). The first sub-pixel electrode (161) and the coupling electrode (153) are separated by the passivation layer (180).

Figure 10:
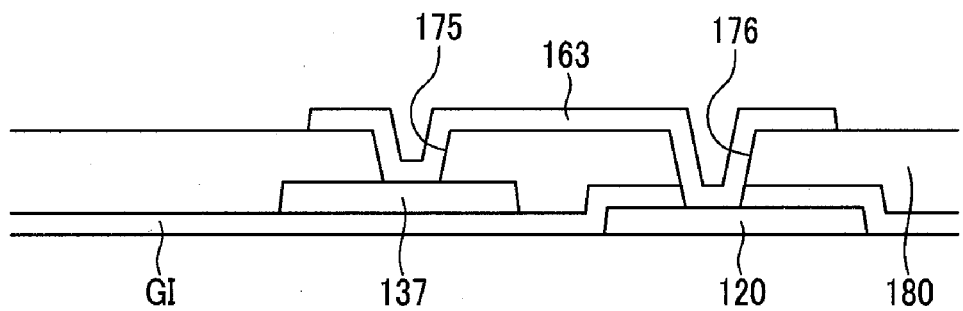
FIG. 10 is a cross-sectional view along a line X-X' in FIG. 8.

FIG. 10 is a cross-sectional view of a structure electrically interconnecting the drain electrode of the third TFT (137) and the storage electrode (120) in a single pixel. This structure is the same as in the first embodiment. The drain electrode of the third TFT (137) is made of the data metal layer. The storage electrode (120) is made of the gate metal layer. The drain electrode and the storage electrode are interconnected by the connecting electrode (163). The connecting electrode (163) is formed on the passivation layer (180), and the passivation layer (180) has contact holes (175 and 176) in each pixel. The drain electrode (137) of the third TFT (TFT3) is connected to the connecting electrode (163) through the contact hole (175), and the storage electrode (120) is connected to the connecting electrode (163) through the contact hole (176) such that the drain electrode of the third TFT (137) and the storage electrode (120) are connected to each other via the connecting electrode (163). The connecting electrode (163) may be formed of the same layer as the first sub-pixel electrode (161) and the second sub-pixel electrode (162).

The invention is not limited to the embodiments described above but includes other embodiments and variations as defined by the appended claims.

What is claimed is:

1. A display apparatus comprising:
a first gate line and a second gate line;
a data line traversing the first and second gate lines;
a first sub-pixel electrode;
a first transistor connected to the first gate line, the data line, and the first sub-pixel electrode;
a second sub-pixel electrode;
a second transistor connected to the first gate line, the data line, and the second sub-pixel electrode;
a storage capacitance electrode;
a third transistor connected to the first gate line and the storage capacitance electrode;
a coupling electrode formed over the storage capacitance electrode, the coupling electrode overlapping the first sub-pixel electrode to form a boost capacitor; and
a fourth transistor connected to the second gate line, the coupling electrode and the second sub-pixel electrode.

2. The display apparatus of claim 1,
wherein the third transistor comprises a source electrode connected to the coupling electrode and a drain electrode connected to the storage capacitance electrode, and the fourth transistor comprises a source electrode connected to the coupling electrode and a drain electrode connected to the second sub-pixel electrode.

3. The display apparatus of claim 2,
wherein the drain electrode of the third transistor is connected to the storage capacitance electrode via a connecting electrode.

4. The display apparatus of claim 3,
wherein the drain electrode of the third transistor and the storage capacitance electrode are made of different metal layers.

5. The display apparatus of claim 3,
wherein the source electrode of the third transistor and the source electrode of the fourth transistor are made of the same metal layer.

6. The display apparatus of claim 1,
wherein the storage capacitance electrode overlaps the first sub-pixel electrode to form a first storage capacitor, and the storage capacitance electrode overlaps the second sub-pixel electrode to form a second storage capacitor.

7. The display apparatus of claim 5 further comprising:
a first auxiliary electrode forming the first storage capacitor with the storage capacitance electrode and connected to the first sub-pixel electrode through a first contact hole; and
a second auxiliary electrode forming the second storage capacitor with the storage capacitance electrode and connected to the second sub-pixel electrode through a second contact hole.

8. The display apparatus of claim 1,
wherein the storage capacitance electrode comprises a first portion overlapping the second sub-pixel electrode to form a second storage capacitor and a second portion having a narrower width than the first portion and overlapping the first sub-pixel electrode to form a first storage capacitor.

9. The display apparatus of claim 8 further comprising:
a third auxiliary electrode forming the second storage capacitor with the first portion of the storage capacitance electrode,
wherein the third auxiliary electrode is connected to the second sub-pixel electrode through a contact hole.

10. A method for manufacturing a display apparatus, the method comprising forming a first gate line; a second gate line; a data line traversing the first and second gate lines; a first sub-pixel electrode; a first transistor connected to the first gate line, the data line, and the first sub-pixel electrode; a second sub-pixel electrode; a second transistor connected to the first gate line, the data line, and the second sub-pixel electrode; a storage capacitance electrode; a third transistor connected to the first gate line and the storage capacitance electrode; a coupling electrode formed over the storage capacitance electrode, the coupling electrode overlapping the first sub-pixel electrode to form a boost capacitor; and a fourth transistor connected to the second gate line, the coupling electrode and the second sub-pixel electrode.

11. The method of claim 10,
wherein the third transistor comprises a source electrode connected to the coupling electrode and a drain electrode connected to the storage capacitance electrode, and the fourth transistor comprises a source electrode connected to the coupling electrode and a drain electrode connected to the second sub-pixel electrode.

12. The method of claim 11,
wherein the drain electrode of the third transistor is connected to the storage capacitance electrode via a connecting electrode.

13. The method of claim 12,
wherein the drain electrode of the third transistor and the storage capacitance electrode are made of different metal layers.

14. The method of claim 12,
wherein the source electrode of the third transistor and the source electrode of the fourth transistor are made of the same metal layer.

15. The method of claim 10,
wherein the storage capacitance electrode overlaps the first sub-pixel electrode to form a first storage capacitor, and the storage capacitance electrode overlaps the second sub-pixel electrode to form a second storage capacitor.

16. The method of claim 14 further comprising:
forming a first auxiliary electrode which forms the first storage capacitor with the storage capacitance electrode and connected to the first sub-pixel electrode through a first contact hole; and
forming a second auxiliary electrode forming the second storage capacitor with the storage capacitance electrode and connected to the second sub-pixel electrode through a second contact hole.

17. The method of claim 10,
wherein the storage capacitance electrode comprises a first portion overlapping the second sub-pixel electrode to form a second storage capacitor and a second portion having a narrower width than the first portion and overlapping the first sub-pixel electrode to form a first storage capacitor.

18. The method of claim 17 further comprising:
forming a third auxiliary electrode which forms the second storage capacitor with the first portion of the storage capacitance electrode,
wherein the third auxiliary electrode is connected to the second sub-pixel electrode through a contact hole.

* * * * *